United States Patent
Sabah et al.

(10) Patent No.: US 9,805,098 B2
(45) Date of Patent: Oct. 31, 2017

(54) METHOD FOR LEARNING A LATENT INTEREST TAXONOMY FROM MULTIMEDIA METADATA

(71) Applicant: InSnap, Inc., Santa Clara, CA (US)

(72) Inventors: Mohammad Sabah, San Jose, CA (US); Mohammad Iman Sadreddin, Santa Clara, CA (US); Shafaq Abdullah, Belmont, CA (US)

(73) Assignee: THE HONEST COMPANY, INC., Santa Monica, CA (US)

( * ) Notice: Subject to any disclaimer, the term of this patent is extended or adjusted under 35 U.S.C. 154(b) by 383 days.

(21) Appl. No.: 14/618,859

(22) Filed: Feb. 10, 2015

(65) Prior Publication Data

US 2016/0203141 A1     Jul. 14, 2016

Related U.S. Application Data

(60) Provisional application No. 62/093,372, filed on Dec. 17, 2014.

(51) Int. Cl.
| | |
|---|---|
| *G06F 17/30* | (2006.01) |
| *G06N 5/02* | (2006.01) |
| *G06Q 30/02* | (2012.01) |
| *G06N 5/04* | (2006.01) |

(52) U.S. Cl.
CPC .... *G06F 17/3053* (2013.01); *G06F 17/30247* (2013.01); *G06F 17/30377* (2013.01); *G06F 17/30598* (2013.01); *G06F 17/30958* (2013.01); *G06N 5/02* (2013.01); *G06Q 30/0269* (2013.01); *G06F 17/3028* (2013.01); *G06F 17/30038* (2013.01); *G06F 17/30256* (2013.01); *G06F 17/30277* (2013.01); *G06F 17/30991* (2013.01); *G06N 5/048* (2013.01)

(58) Field of Classification Search
CPC ......... G06F 17/30247; G06F 17/30277; G06F 17/30991; G06F 17/30038; G06F 17/30256; G06F 17/30268; G06F 17/30598; G06F 17/30799; G06F 17/30705
USPC ....... 707/739, 722, 723, 737, 776, 780, 802, 707/728
See application file for complete search history.

(56) References Cited

U.S. PATENT DOCUMENTS

| | | | | |
|---|---|---|---|---|
| 8,145,677 | B2* | 3/2012 | Al-Shameri | G06F 17/30333 707/802 |
| 8,832,080 | B2* | 9/2014 | Zhang | G06F 17/3028 707/722 |
| 9,280,565 | B1* | 3/2016 | Rizk | G06K 9/00624 |
| 9,600,499 | B2* | 3/2017 | Kutaragi | G06K 9/4676 |
| 2011/0302124 | A1* | 12/2011 | Cai | G06F 17/30707 706/52 |

(Continued)

*Primary Examiner* — Dangelino Gortayo
(74) *Attorney, Agent, or Firm* — Patterson + Sheridan, LLP

(57) ABSTRACT

Techniques are disclosed herein for learning latent interests based on metadata of one or more images. An analysis tool associates one or more attributes with each of the objects based on a time and a location described in the metadata of that object. Each of the attributes describes one of a plurality of locations or an event scheduled to occur at one or more of the plurality of locations. The analysis tool identifies one or more concepts from a distribution of the one or more attributes to each of the objects. Each of the one or more concepts includes at least a first attribute in the distribution that co-occurs with a second attribute in the distribution.

20 Claims, 8 Drawing Sheets

(56) References Cited

U.S. PATENT DOCUMENTS

| | | | | |
|---|---|---|---|---|
| 2014/0358900 A1* | 12/2014 | Payne | ............... | G06F 17/30991 707/722 |
| 2015/0242689 A1* | 8/2015 | Mau | ................. | G06F 17/30247 382/190 |
| 2016/0093334 A1* | 3/2016 | Kim | ..................... | G06K 9/4604 386/278 |

* cited by examiner

FIGURE 8

|     | a1   | a2  | a3 | a4  | a5  | a6  |
|-----|------|-----|----|-----|-----|-----|
| c1  | 0.35 | .87 | .3 | .1  | .09 | .74 |
| c2  | .9   | .3  | .2 | .89 | .75 | .36 |
| c3  | .23  | .05 | .4 | .02 | .03 | .1  |
| c4  | .8   | .1  | .44| .3  | .08 | .02 |
| c5  | .6   | .4  | .06| .12 | .17 | .4  |

METHOD FOR LEARNING A LATENT INTEREST TAXONOMY FROM MULTIMEDIA METADATA

CROSS-REFERENCE TO RELATED APPLICATIONS

This application claims priority to U.S. Provisional Application No. 62/093,372, filed Dec. 17, 2014. The content of the aforementioned application is incorporated by reference in its entirety.

BACKGROUND

Field

Embodiments of the present disclosure generally relate to data analytics. More specifically, embodiments presented herein relate to learning latent interests based on image or video metadata.

Description of the Related Art

Individuals take images to capture personal experiences and events. The images can represent mementos of various times and places experienced in an individual's life.

In addition, mobile devices (e.g., smart phones, tablets, etc.) allow individuals to easily capture both digital images as well as record video. For instance, cameras in mobile devices have steadily improved in quality and are can capture high-resolution images. Further, mobile devices now commonly have a storage capacity that can store thousands of images. And because individuals carry smart phones around with them, they can capture images and videos virtually anywhere.

This has resulted in an explosion of multimedia content, as virtually anyone can capture and share digital images and videos via text message, image services, social media, video services, and the like. This volume of digital multimedia, now readily available, provides a variety of information.

SUMMARY

One embodiment presented herein describes a method for identifying latent relationships between interests based on metadata of a plurality of digital multimedia objects. The method generally includes associating one or more attributes with each of the objects based on a time and a location described in the metadata of that object. Each of the attributes describes one of a plurality of locations or an event scheduled to occur at one or more of the plurality of locations. The method also includes identifying one or more concepts from a distribution of the one or more attributes to each of the objects. Each of the one or more concepts includes at least a first attribute in the distribution that co-occurs with a second attribute in the distribution.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 8 illustrates an example concept-attribute matrix, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
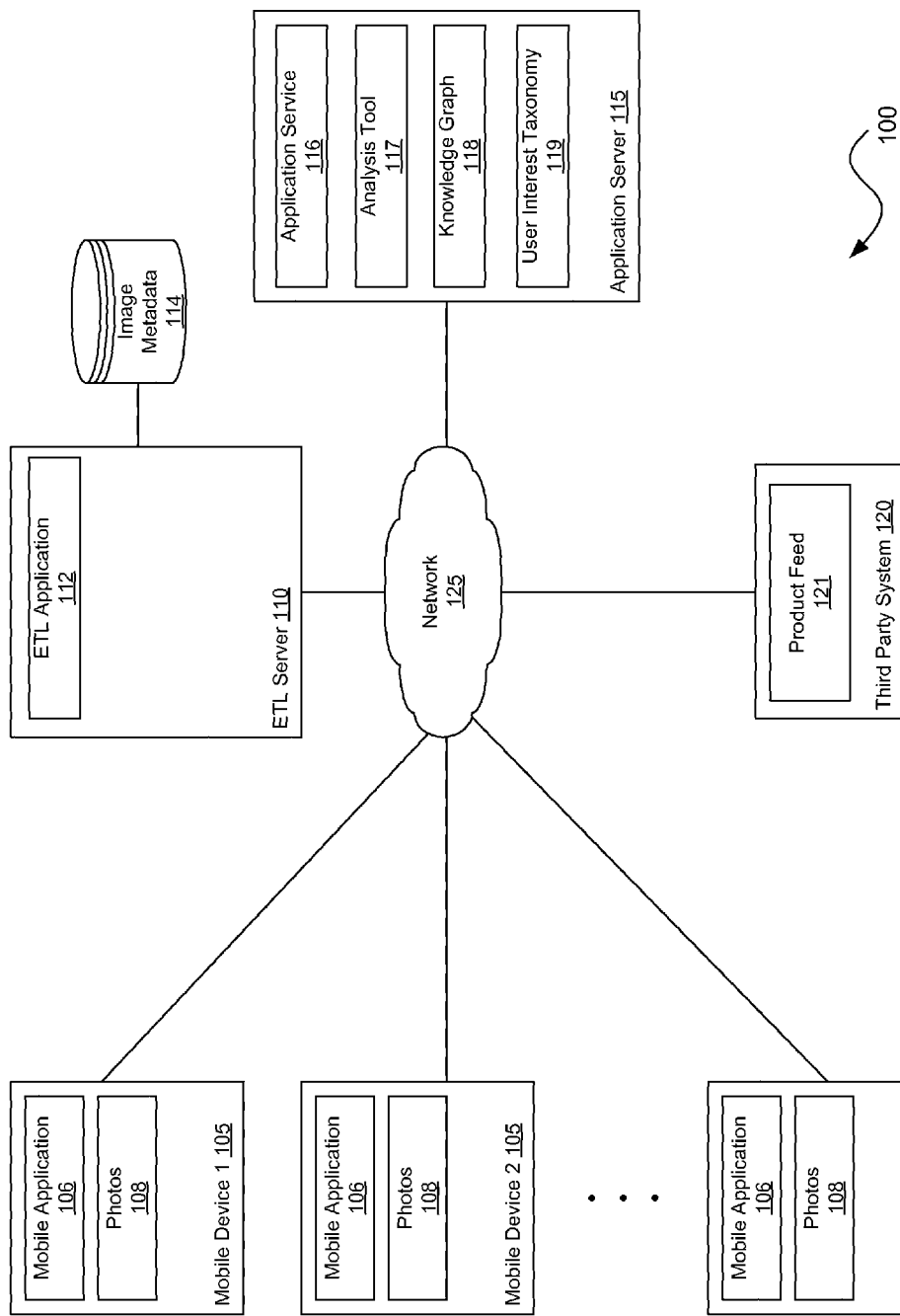
FIG. 1 illustrates an example computing environment, according to one embodiment.

Embodiments presented herein describe techniques for inferring user interests from metadata associated with digital multimedia (e.g., images and video). Digital multimedia provides a wealth of information which can be evaluated to determine a variety of valuable insights about individuals taking images (e.g., advertisers, marketers, and the like). For example, assume an individual takes pictures at a golf course using a mobile device (e.g., a smart phone, tablet, etc.). Further, assume that the pictures are the only indication the individual was at the golf course (e.g., because the individual made only cash purchases and signed no registers). Metadata associated with this image can place the individual at the golf course at a specific time. Further, event data could be used to correlate whether there was going on at that time (e.g., a specific tournament). Such information may be useful to third parties, e.g., for targeted advertising and recommendations.

However, an advertiser might not be able to identify an effective audience for targeting a given product or service based on such information alone. Even if image metadata places an individual at a golf course at a particular point of time, the advertiser might draw inaccurate inferences about the individual. For example, the advertiser might assume that because the metadata places the individual at a high-end golf course, the individual is interested in high-end golf equipment. The advertiser might then recommend other high-end equipment or other golf courses to that individual. If the individual rarely plays golf or does not usually spend money at high-end locations. Such recommendations may lead to low conversion rates for the advertiser. Historically, advertisers have been generally forced to accept low conversation rates, as techniques for identifying individuals likely to be receptive to or interested in a given product or service are often ineffective. Embodiments presented herein provide techniques to infer interests over a userbase based on metadata of digital multimedia. Specifically, embodiments describe techniques for learning latent concepts from metadata attributes of digital multimedia (e.g., images and video). In one embodiment, a multimedia service platform provides a software development kit (SDK) that may third parties (e.g., retailers, marketers, etc.) may use to build mobile applications that extracts metadata from digital multimedia captured and stored on a mobile device. The mobile application can use APIs included in the SDK to upload images and videos to the platform from a mobile device. Further, the multimedia service platform may identify patterns from metadata extracted from images and videos of many users. The metadata may describe where and when a given image was taken. Further, in many cases, embodiments presented herein can identify latent relationships between different categories, topics, or subjects (referred to generally as interests or user interests) from multimedia collections of multiple users. For example, if many users take pictures at golf courses also take pictures at an unrelated event (e.g., take pictures of a traveling museum exhibit) then the system can discover a relationship between these otherwise unrelated interests. Thereafter, advertising related to golfing products and services could be targeted to individuals who publish pictures of the travelling museum exhibit, regardless of any other known interest in golf.

In one embodiment, the multimedia service platform evaluates metadata corresponding to each image or video submitted to the platform against a knowledge graph. The knowledge graph provides a variety of information about events, places, dates, times, etc. that may be compared with the metadata of a given image. For example, the knowledge graph may include weather data, location data, event data, and online encyclopedia data. For instance, attributes associated with an event may include a name, location, start time, end time, price range, etc. The multimedia service platform correlates spatiotemporal metadata from a digital image with a specific event in the knowledge graph. That is, the knowledge graph is used to impute attributes related to events, places, dates, times, etc., to a given digital multimedia file based on the metadata provided with that file.

In one embodiment, the analysis tool represents attributes imputed to digital multimedia in a user-attribute matrix, where each row of the matrix represents a distinct user and each column represents an attribute from the knowledge graph that can be imputed to a digital multimedia file. The analysis tool may add columns to the user-attribute matrix as additional attributes are identified. The cells of a given row indicate how many times a given attribute has been imputed to a digital multimedia file published by a user corresponding to that row. Accordingly, when the analysis tool imputes an attribute to a digital multimedia file (based on the file metadata), a value for that attribute is incremented in the user-attribute matrix. Doing so allows the multimedia service platform to identify useful information about that user. For instance, the analysis tool may identify that a user often attends sporting events, movies, participates in a particular recreational event (e.g., skiing or golf), etc. In addition, the analysis tool may identify information about events that the user attends, such as whether the events are related to a given sports team, whether the events are related to flights from an airport, a range specifying how much the event may cost, etc.

In one embodiment, the multimedia service platform learns concepts from the attribute distribution. A concept is a collection of one or more identified attributes. The multimedia service platform may perform machine learning techniques to learn concepts from the attributes of the user-attribute matrix. Such techniques may group attributes by co-occurrences. For instance, "travel," "winter," "Park City," and "skiing" may frequently co-occur. As a result, the machine learning techniques may group these co-occuring attributes into a concept (e.g., a "skiing" concept). Further, the multimedia service platform may score an attribute to each respective concept. The multimedia service platform may associate attributes that satisfy specified criteria (e.g., the top five scores per concept, attributes exceeding a specified threshold, etc.) to a given concept.

Further, the analysis tool may generate an interest taxonomy based on the learned concepts. In one embodiment, an interest taxonomy is a hierarchical representation of user interests. For example, the interest taxonomy can identify general groups (e.g., sports, music, and travel) and sub-groups (e.g., basketball, rock music, and discount airlines) of interest identified from the concepts. The multimedia service platform may use the interest taxonomy to discover latent relationships between concepts. For example, the multimedia service platform may build a predictive learning model using the interest taxonomy.

Note, the following description relies on digital images captured by a user and metadata as a reference example of learning latent interests based on the metadata. However, one of skill in the art will recognize that the embodiments presented herein may be adapted to other digital multimedia that include time and location metadata, such as digital videos captured on a mobile device. Further, an analysis tool may extract metadata particular to a type of the multimedia, e.g., the length of a video, which can be used relative to the techniques described herein.

FIG. 1 illustrates an example computing environment 100, according to one embodiment. As shown, the computing environment 100 includes mobile devices 105, an extract, transform, and load (ETL) server 110, an application server 115, and a third party system 120, connected to a network 125 (e.g., the Internet).

In one embodiment, the mobile devices 105 include a mobile application 106 which allows users to interact with a multimedia service platform (represented by the ETL server 110 and the application server 115). In one embodiment, the mobile application 106 is developed by a third-party enterprise (e.g., a retailer, social network provider, fitness tracker developer, etc.). The mobile application 106 may send images 108 and associated metadata to the multimedia service platform. In one embodiment, the mobile application 106 may access APIs exposed by a software development kit (SDK) distinct to the platform.

In another embodiment, the mobile application 106 may access a social media service (application service 116) provided by the service platform. The social media service allows users to capture, share, and comment on images 108 as a part of existing social networks (or in conjunction) with those social networks. For example, a user may publish images 108 captured using a camera on mobile device 105 to a specified social network. In turn, the application 106 retrieves metadata and images 108 and metadata to the multimedia service platform. The multimedia service platform uses the metadata to infer latent interests of the userbase as well as latent relationships between the interests.

The mobile application 106 extracts Exchangeable Image Format (EXIF) metadata from each image 108. The mobile application 106 can also extract other metadata (e.g., PHAsset metadata in Apple iOS devices) describing additional information, such as GPS data. In addition, the mobile application 106 may perform extract, transform, and load (ETL) operations on the metadata to format the metadata for use by components of the multimedia service platform. For example, the mobile application 106 may determine additional information based on the metadata, such as whether a given image was taken during daytime or nighttime, whether the image was taken indoors or outdoors, whether the image is a "selfie," etc. Further, the mobile application 106 also retrieves metadata describing application use. Such metadata includes activity by the user on the mobile application 106, such as image views, tagging, etc. Further, as described below, the mobile application 106 provides functionality that allows a user to search through a collection of images by the additional metadata, e.g., searching a collection of images that are "selfies" and taken in the morning.

In one embodiment, the ETL server 110 includes an ETL application 112. The ETL application 112 receives streams of image metadata 114 (e.g., the EXIF metadata, PHAsset metadata, and additional metadata) from mobile devices 105. Further, the ETL application 112 cleans, stores, and indexes the image metadata 114 for use by the application server 115. Once processed, the ETL application 112 may store the image metadata 114 in a data store (e.g., such as in a database or a Hadoop-based storage infrastructure such as Hive) for access by the application server 115.

In one embodiment, the application service 116 communicates with the mobile application 106. The application server 115 may be a physical computing system or a virtual machine instance in a computing cloud. Although depicted as a single server, the application server 115 may comprise multiple servers configured as a cluster (e.g., via the Apache Spark framework, via a Hadoop-based storage infrastructure, etc.). A clustered architecture allows the application servers 115 to process large amounts of images and image metadata sent from mobile applications 106.

As shown, the application server 115 includes an analysis tool 117, a knowledge graph 118, and a user interest taxonomy 119. As described below, the user interest taxonomy 119 represents interests inferred from image attributes identified from the knowledge graph 118 based on the image metadata 114 from image collections of multiple users.

In one embodiment, the knowledge graph 118 includes a collection of attributes which may be imputed to an image. Example attributes include time and location information, event information, genres, price ranges, weather, subject matter, and the like. The analysis tool 117 builds the knowledge graph 118 using weather data, location data, events data, encyclopedia data, and the like from a variety of data sources.

In one embodiment, the analysis tool 117 imputes attributes from the knowledge graph 118 to an image 108 based on the metadata 114. That is, the analysis tool 117 may correlate time and location information in image metadata 114 to attributes in the knowledge graph 118. For example, assume that a user captures an image 108 of a baseball game. Metadata 114 for that image 108 may include a GPS, a date, and a time when the image 108 was captured. The analysis tool 117 can correlate this information to attributes such as weather conditions at that time and location (e.g., "sunny"), an event name (e.g., "Dodgers Game"), teams playing at that game (e.g., "Dodgers" and "Cardinals"), etc. The analysis tool 117 associates the imputed attributes with the user who took the image. As noted, e.g., a row in a user attribute matrix may be updated to reflect the imputed attributes of each new image taken by that user. Further, the analysis tool 117 may perform machine learning techniques, such as Latent Dirichlet Analysis (LDA), to decompose the user-attribute matrix into sub-matrices. Doing so allows the analysis tool 117 to identify concepts, i.e., clusters of attributes. The analysis tool 117 may use the user interest taxonomy 119 to generate product recommendations. The analysis tool 117 may also use the interest taxonomy 119 identify one or more users that may be interested in a product or service. For example, the analysis tool 117 may extract information from a product feed 121 of a third party system 120. In one embodiment, the product feed 121 is a listing of products or services of a third party, such as a retailer. The analysis tool 117 may identify, from the product feed 121, one or more attributes describing each product. For example, a product of a shoe retailer may have attributes such as "shoe," "running," "menswear," and so on. The analysis tool 117 can map the attributes of the product feed 121 with the interest taxonomy 119. Doing so allows the analysis tool 117 to identify products and services from the feed 121 that align with interests in the interest taxonomy. In turn, third parties can target users who may be interested in the identified products and services.

Figure 2:
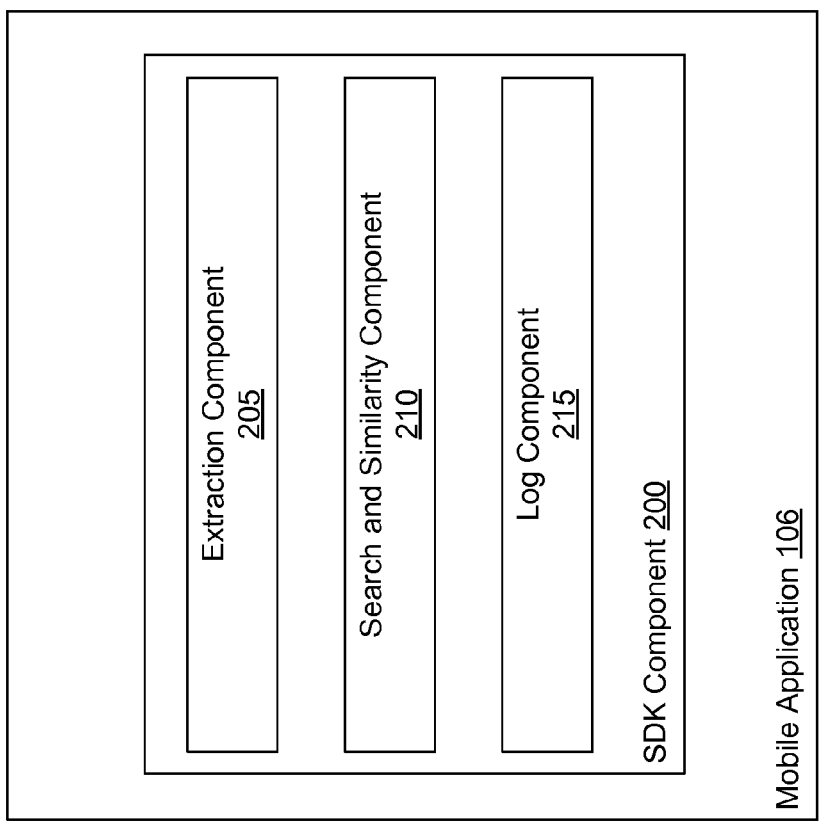
FIG. 2 further illustrates the mobile application described relative to FIG. 1, according to one embodiment.

FIG. 2 illustrates mobile application 106, according to one embodiment. As shown, mobile application 106 includes a SDK component 200 with APIs configured to send image and metadata information to the multimedia service platform. The SDK component 200 further includes an extraction component 205, a search and similarity component 210, and a log component 215. In one embodiment, the extraction component 205 extracts metadata (e.g., EXIF metadata, PHAsset metadata, and the like) from images captured using a mobile device 105. The metadata may describe various aspects specific the image, such as whether the image is in color or black and white, whether the image is a "selfie," and the like. Further, the extraction component 205 may perform ETL preprocessing operations on the metadata. For example, the extraction component 205 may format the metadata for the search and similarity component 210 and the log component 215.

In one embodiment, the search and similarity component 210 infers additional metadata from an image based on the metadata (e.g., spatiotemporal metadata) retrieved by the extraction component 205. Examples of additional metadata include whether a given image was captured at daytime or nighttime, whether the image was captured indoors or outdoors, whether the image was edited, weather conditions when the image was captured, etc. Further, the search and similarity component 210 generates a two-dimensional image feature map from a collection of images captured on a given mobile device 105, where each row represents an image and columns represent metadata attributes. Cells of the map indicate whether an image has a particular attribute. The image feature map allows the search and similarity component 210 to provide search features to a user. For example, the mobile application 106 may search for images on a mobile device which have a given attribute, such as images taken during daytime or taken from a particular location. In turn, the search and similarity component 210 may evaluate the image map to identify images (or other multimedia) having the particular attribute.

In one embodiment, the log component 215 evaluates the image metadata. For example, the log component 215 records metadata sent to the ETL server 110. Once received, the application 112 performs ETL operations, e.g., loading the metadata into a data store (such as a database). The metadata is accessible by the analysis tool 117.

Figure 3:
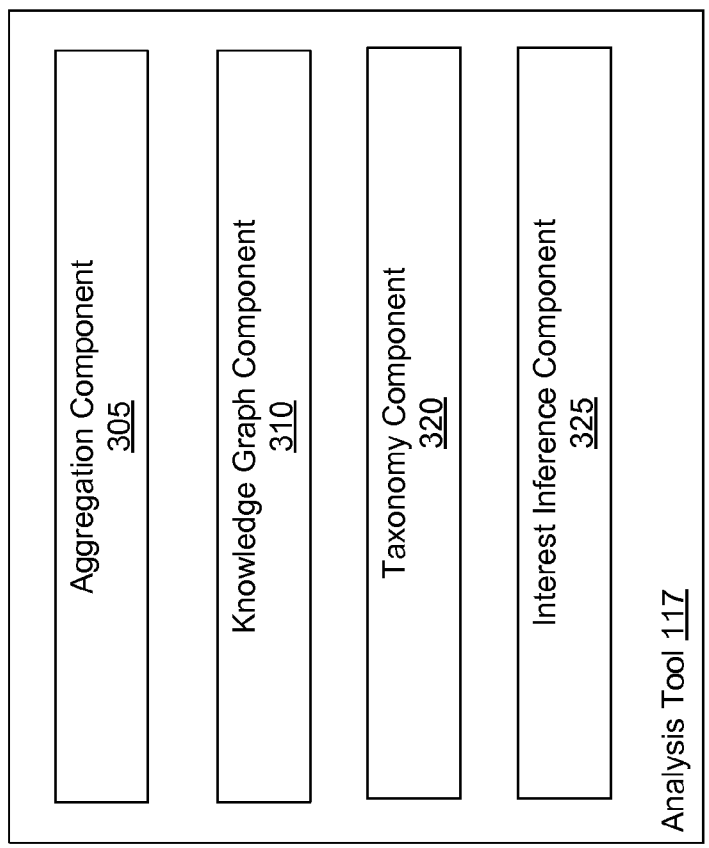
FIG. 3 further illustrates the analysis tool described relative to FIG. 1, according to one embodiment.

FIG. 3 further illustrates the analysis tool 117, according to one embodiment. As shown, the analysis tool 117 includes an aggregation component 305, a knowledge graph component 310, a user interest taxonomy generation component 320, and a user interest inference component 325.

In one embodiment, the aggregation component 305 receives streams of image metadata corresponding to images captured by users of application 106 by users from the ETL server 110. Once received, the aggregation component 305 organizes images and metadata by user. The metadata may include both raw image metadata (e.g., time and GPS information) and inferred metadata (e.g., daytime or nighttime image, indoor or outdoor image, "selfie" image, etc.). To organize metadata by user, the aggregation component 305 evaluates log data from the ETL server 110 to identify image metadata from different devices (and presumably different users) and metadata type (e.g., whether the metadata corresponds to image metadata or application usage data).

In one embodiment, the knowledge graph component 310 builds (and later maintains) the knowledge graph 118 using any suitable data source, such as local news and media websites, online event schedules for performance venues, calendars published by schools, government, or private enterprises, online schedules and ticket sales. The knowledge graph component 310 determines attributes related to each event to store in the knowledge graph 118.

In one embodiment, to impute attributes from the knowledge graph 118 to a given image, the correlation component 315 evaluates time and location metadata of the image against the knowledge graph 118. The correlation component 315 determines whether the image metadata matches a location and/or event in the knowledge graph. The information may be matched using a specified spatiotemporal range, e.g., within a time period of the event, within a set of GPS coordinate range, etc. In one embodiment, the component 315 may further match the information based on a similarity of metadata of other user photos that have been matched to that event.

In one embodiment, the taxonomy component 320 evaluates the user-attribute matrix to determine concepts associated with a given user. As stated, a concept is a cluster of related attributes. The interest taxonomy generation component 320 may perform machine learning techniques, such as latent Dirichlet analysis (LDA), non-negative matrix factorization (NNMF), deep learning, and the like, to decompose the user-attribute matrix into sub-matrices. The taxonomy component 320 evaluates the sub-matrices to identify latent concepts from co-occurring attributes.

Further, the taxonomy component 320 may determine a membership score distribution for each attribute over each concept. A membership score indicates a measure of strength that a given attribute correlates with a concept. The interest taxonomy generation component 320 may populate a concept-attribute matrix, where the rows represent concepts and columns represent attributes. Each cell value is the membership score of the respective attribute to the respective concept. The generation component 320 may perform further machine learning techniques (e.g., LDA, NNMF, deep learning, etc.) to identify relationships and hierarchies between each concepts. An example of the concept-attribute matrix is discussed relative to FIG. 8.

In one embodiment, the interest inference component 325 builds a learning model based on the identified concepts and the users. To do so, the interest inference component 325 may train classifiers for predicting interest scores, e.g., through logistic regression models, boosting, or support vector machine (SVM) classifiers for each concept to determine user association in one or more concepts. Doing so results in each user in the platform being assigned an interest score per concept.

Once trained, the interest inference component 325 may predict user interests using the learning model. As the multimedia service platform receives image metadata from new users, the interest inference component 325 can assign the new users with scores for each concept based on the metadata and the learning model. A user having a high membership score in a given concept may indicate a high degree of interest for that concept.

Figure 4:
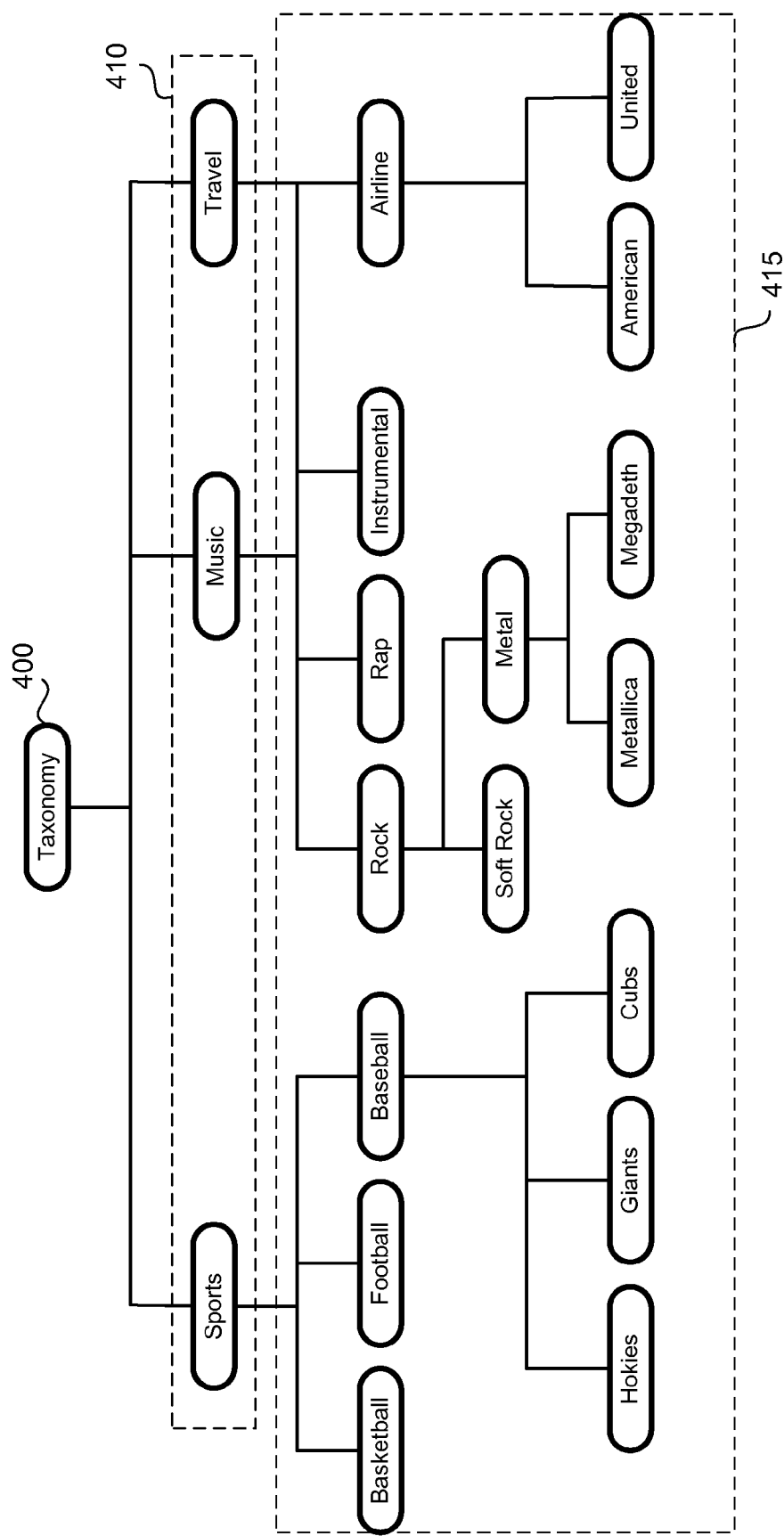
FIG. 4 illustrates an example user interest taxonomy, according to one embodiment.

FIG. 4 illustrates an example user interest taxonomy 400, according to one embodiment. As shown, the taxonomy 400 is a hierarchical representation of user interests identified from image metadata, such as metadata describing time and location information of a given image. Each node in the taxonomy 400 represents a concept identified from one or more attributes. As stated, the interest taxonomy generation component 320 may perform machine learning (e.g., LDA) to identify hierarchies and relationships between concepts. The hierarchies and relationships may further be determined manually (e.g., by a subject matter expert).

The taxonomy 400 includes groups 410 and sub-groups 415. Illustratively, the concepts depicted in groups 410 include generally broader concepts, such as sports, music, and travel. The sub-groups 415 include more specific concepts related to the groups 410, such as basketball, rock, and airlines. Further, each sub-group 415 may have its own subgroup. For example, the baseball node may include sub-group nodes depicting team names. Note, FIG. 4 depicts a relatively small amount of concept nodes in the taxonomy 400. In practice, the taxonomy 400 may include a greater amount of nodes (e.g., 1,000 concept nodes).

The analysis tool 117 may associate each user in the multimedia service platform with one or more concepts in the interest taxonomy 400. For a given user, the inference component 325 may determine a distribution of membership scores to each identified concept. The membership score may correlate to a degree of interest that the user has for a given concept. For example, a high membership score in the football concept may indicate that a user has a high interest in football. Such information may be useful to third party advertisers for targeted recommendations.

Figure 5:
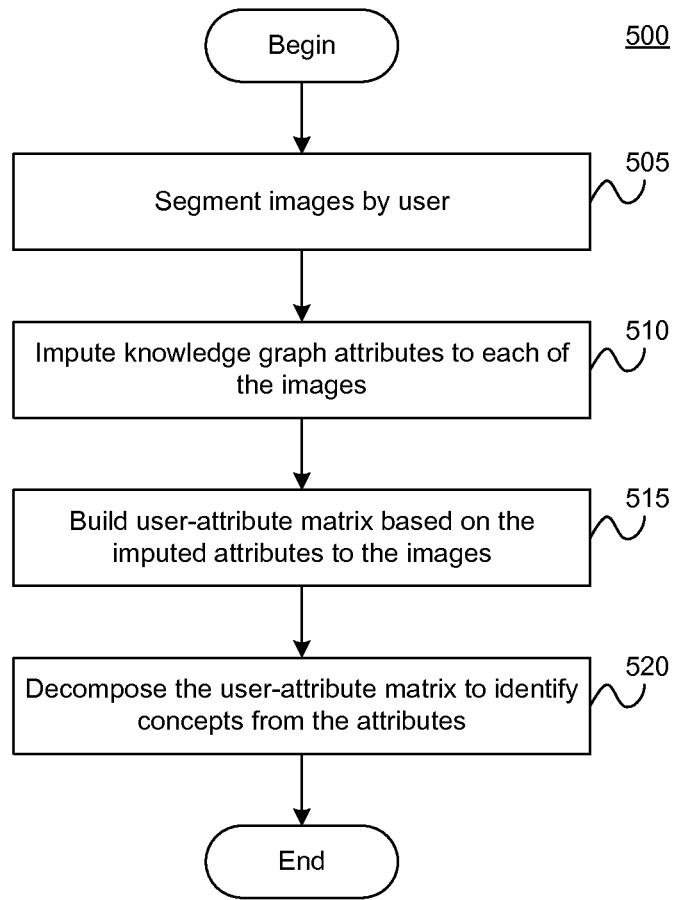
FIG. 5 illustrates a method for determining a set of concepts based on image metadata, according to one embodiment.

FIG. 5 illustrates a method 500 for determining a set of concepts based on image metadata, according to one embodiment. Method 500 begins at step 505, where the aggregation component 305 segments images by users. Doing so allows the analysis tool 107 to evaluate collections of image metadata for each user individually.

At step 510, the knowledge graph component 310 imputes attributes from the knowledge graph 118 onto the images based on the image metadata. That is, the knowledge graph component 310 compares time and location metadata to information in the knowledge graph 118. The graph component 310 correlates time and location metadata of a given image to information provided in the knowledge graph, such as events, that coincide with the time and location metadata (with a degree of allowance). The graph component 310 may then identify attributes based on the correlated information (e.g., "ballpark," "United Center," "Bulls," "Cavaliers," "Chicago," "winter," etc.). As a result, each image is associated with a set of attributes.

At step 515, the knowledge graph component 310 builds a user-attribute matrix based on the imputed attributes to the images. The knowledge graph component 310 further imputes attributes associated with each image to the respective user. Each cell in the user-attribute matrix is an incremental value that represents a count of images in which the corresponding attribute is present.

At step 520, the interest taxonomy generation component 320 decomposes the user-attribute matrix to identify concepts from the attributes. As stated, a concept may include one or more attributes. The interest taxonomy generation component 320 may evaluate the attributes using machine learning techniques to identify the concepts.

Figure 6:
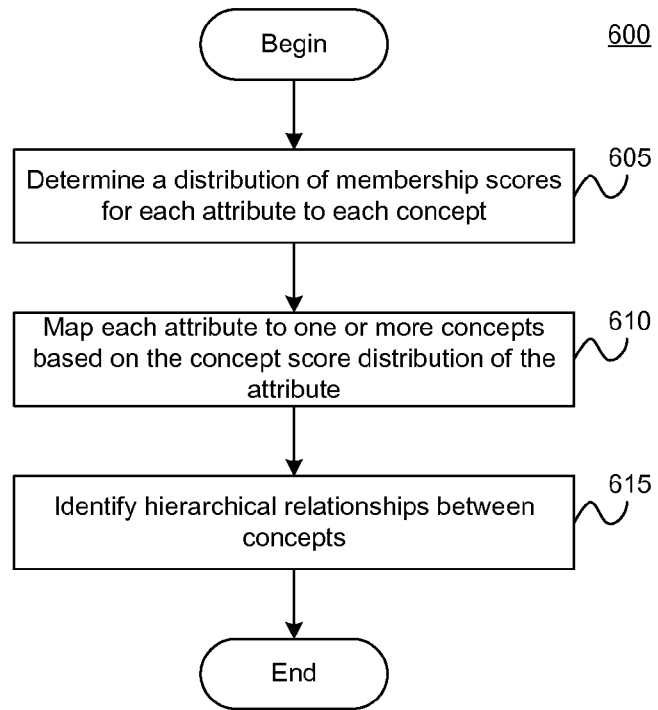
FIG. 6 illustrates a method for generating a user interest taxonomy based on image metadata, according to one embodiment.

FIG. 6 illustrates a method 600 for generating a user interest taxonomy based on image metadata, according to one embodiment. Assume that the interest taxonomy generation component 320 has identified a set of concepts from the attributes. At step 605, the interest taxonomy generation component 320 determines a distribution of membership scores of attributes to each identified concept. Each score indicates the likelihood that an attribute is associated with the concept.

At step 610, the interest taxonomy generation component 320 maps each attribute to one or more concepts based on the distribution. To do so, the interest taxonomy generation component 320 may, for each concept, rank each attribute by membership score and determine that a specified top amount of attributes are associated with a given concept (e.g., top three, top five, etc.). Alternatively, the interest taxonomy generation component 320 may determine that attributes exceeding a threshold score are associated with the concept.

At step 615, the interest taxonomy generation component 320 optionally identifies hierarchical relationships between the concepts. The interest taxonomy generation component 320 may identify the relationships through machine learning, such as LDA. In addition, the relationships may be manually assigned.

Figure 7:
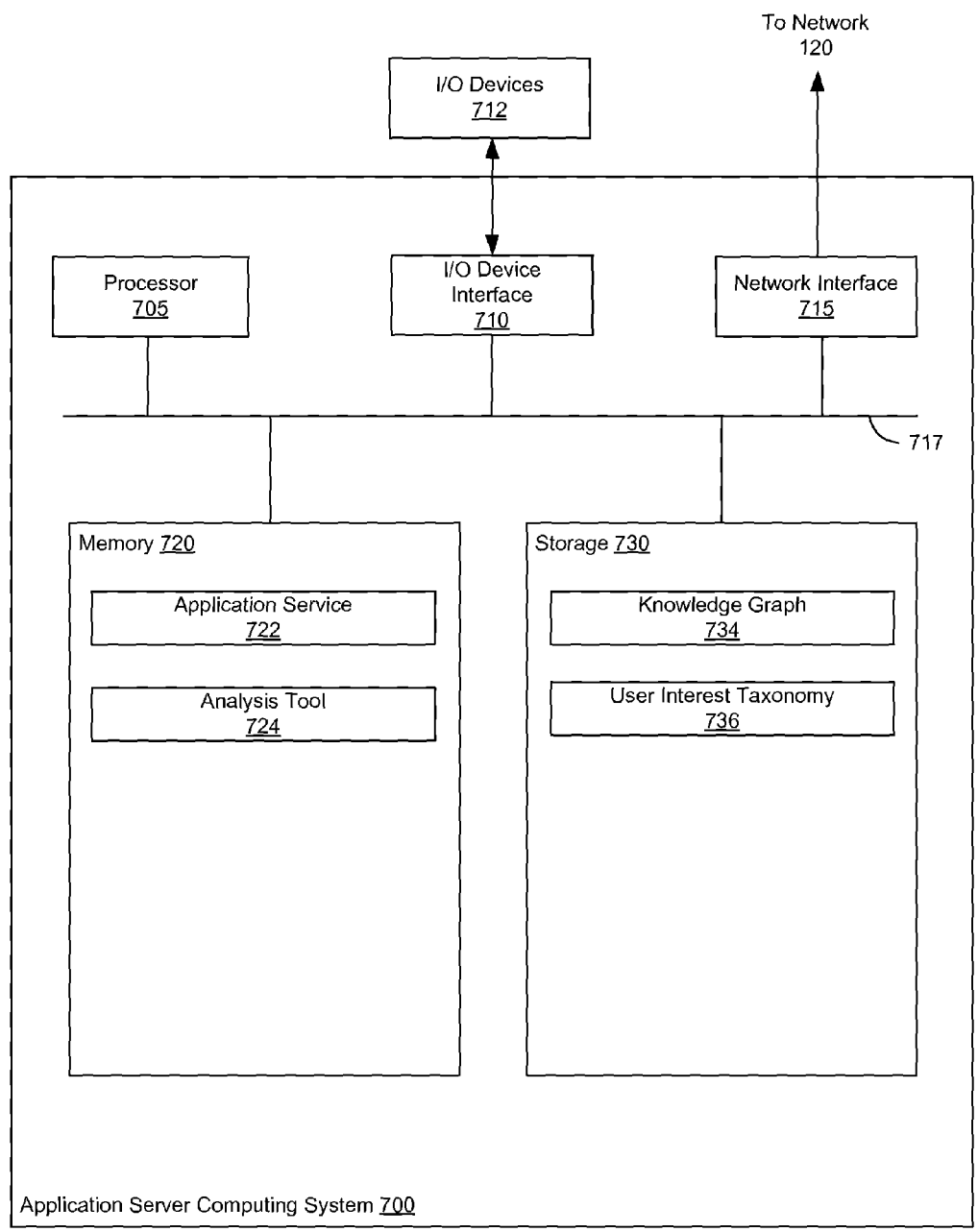
FIG. 7 illustrates an example application server computing system, according to one embodiment.

FIG. 7 illustrates an application server computing system 700, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, mouse, and display devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes an application service 722 and an analysis tool 724. The storage 730 includes a knowledge graph 734, and one or more user interest taxonomies 736. The application service 722 provides access to various services of an multimedia service platform to mobile devices. The analysis tool 724 generates a user interest taxonomy 736 based on metadata of images taken by users.

Further, the analysis tool 724 builds the knowledge graph 734 from external data sources. To do so, the analysis tool 724 performs NLP techniques on the raw text obtained from the data sources to identify relevant terms related to events, moments, weather, etc. Further, the analysis tool 724 may impute information from the knowledge graph 734 images submitted to the multimedia service platform. In addition, the analysis tool 724 generates a user interest taxonomy 736 of concepts inferred from the attributes. To do so, the analysis tool 724 may perform machine learning techniques to identify concepts based on co-occurring attributes. In addition, the analysis tool 724 may determine a membership score for each attribute to each identified concept. The analysis tool 724 may associate attributes to a given concept based on the membership score. Further, the analysis tool 724 may identify hierarchical relationships between the concepts through machine learning.

FIG. 8 illustrates an example attribute-concept matrix, according to one embodiment. Illustratively, rows 805 of the matrix represent concepts (i.e., c1, c2, c3, and so on) and columns 810 of the matrix represent attributes (i.e., a1, a2, a3, and so on). Values in each cell 815 represents a membership score of a given attribute to a concept. As stated, a membership score indicates a measure of strength of an attribute to a given concept. The analysis tool 117 may cluster attributes having scores exceeding a specified threshold to a given concept. For example, assume that the threshold is 0.65. In such a case, the analysis tool 117 would associate a2 (having a score of 0.87) and a6 (having a score of 0.74) with concept c1.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for identifying latent relationships between interests based on metadata of a plurality of digital multimedia objects, the method comprising:
    evaluating metadata associated with each digital multimedia object against a knowledge graph, wherein the knowledge graph is built from data comprising information external to each of the digital multimedia objects and wherein the knowledge graph provides a plurality of attributes, each attribute describing information relating to an event scheduled at one of a plurality of locations;
    associating, based on the evaluation, one or more of the plurality of attributes with each of the digital multimedia objects, the one or more attributes correlating with a time and a location described in the metadata of that object;
    identifying one or more concepts from a distribution of the associated attributes to each of the objects; and
    mapping each of the plurality of attributes to the one or more concepts based on the distribution.

2. The method of claim 1, wherein mapping each of the plurality of attributes to the one or more concepts comprises:
    determining a membership score of each of the one or more attributes to each of the one or more concepts, wherein the membership score is a measure indicating a strength of correlation of a given attribute to a given concept.

3. The method of claim 2, wherein each of the attributes is associated with at least one of the one or more concepts based on the membership score.

4. The method of claim 1, further comprising:
    determining, from the one or more concepts, a hierarchical relationship between a first concept and at least a second concept.

5. The method of claim 1, wherein the one or more concepts are further identified based on latent Dirichlet allocation.

6. The method of claim 1, wherein the attributes are imputed to each of the one or more digital multimedia objects from the knowledge graph, wherein the attributes further describe the plurality of locations.

7. The method of claim 1, wherein each of the digital multimedia objects is one of an image or a video.

8. A non-transitory computer-readable storage medium storing instructions, which, when executed on a processor, performs an operation for identifying latent relationships between interests based on metadata of a plurality of digital multimedia objects, the operation comprising:

evaluating metadata associated with each digital multimedia object against a knowledge graph, wherein the knowledge graph is built from data comprising information external to each of the digital multimedia objects and wherein the knowledge graph provides a plurality of attributes, each attribute describing information relating to an event scheduled at one of a plurality of locations;

associating, based on the evaluation, one or more of the plurality of attributes with each of the digital multimedia objects, the one or more attributes correlating with a time and a location described in the metadata of that object;

identifying one or more concepts from a distribution of the associated attributes to each of the objects; and mapping each of the plurality of attributes to the one or more concepts based on the distribution.

9. The computer-readable storage medium of claim 8, wherein mapping each of the plurality of attributes to the one or more concepts comprises:

determining a membership score of each of the one or more attributes to each of the one or more concepts, wherein the membership score is a measure indicating a strength of correlation of a given attribute to a given concept.

10. The computer-readable storage medium of claim 9, wherein each of the attributes is associated with at least one of the one or more concepts based on the membership score.

11. The computer-readable storage medium of claim 8, wherein the operation further comprises:

determining, from the one or more concepts, a hierarchical relationship between a first concept and at least a second concept.

12. The computer-readable storage medium of claim 8, wherein the one or more concepts are further identified based on latent Dirichlet allocation.

13. The computer-readable storage medium of claim 8, wherein the attributes are imputed to each of the one or more digital multimedia objects from the knowledge graph, wherein the attributes further describe the plurality of locations.

14. The computer-readable storage medium of claim 8, wherein each of the digital multimedia objects is one of an image or a video.

15. A system, comprising:

a processor; and a memory storing one or more application programs configured to perform an operation for identifying latent relationships between interests based on metadata of a plurality of digital multimedia objects, the operation comprising:

evaluating metadata associated with each digital multimedia object against a knowledge graph, wherein the knowledge graph is built from data comprising information external to each of the digital multimedia objects and wherein the knowledge graph provides a plurality of attributes, each attribute describing information relating to an event scheduled at one of a plurality of locations, associating, based on the evaluation, one or more of the plurality of attributes with each of the digital multimedia objects, the one or more attributes correlating with a time and a location described in the metadata of that object, identifying one or more concepts from a distribution of the associated attributes to each of the objects, and mapping each of the plurality of attributes to the one or more concepts based on the distribution.

16. The system of claim 15, wherein mapping each of the plurality of attributes to the one or more concepts comprises:

determining a membership score of each of the one or more attributes to each of the one or more concepts, wherein the membership score is a measure indicating a strength of correlation of a given attribute to a given concept.

17. The system of claim 16, wherein each of the attributes is associated with at least one of the one or more concepts based on the membership score.

18. The system of claim 15, wherein the operation further comprises:

determining, from the one or more concepts, a hierarchical relationship between a first concept and at least a second concept.

19. The system of claim 15, wherein the one or more concepts are further identified based on latent Dirichlet allocation.

20. The system of claim 15, wherein each of the digital multimedia objects is one of an image or a video and wherein the attributes are imputed to each of the one or more digital multimedia objects from the knowledge graph, wherein the attributes further describe the plurality of locations.

* * * * *